United States Patent [19]
Chen

[11] 4,308,298
[45] Dec. 29, 1981

[54] UPGRADING OF CELLULOSIC BOARDS

[75] Inventor: Yang-Hsien Chen, Longview, Wash.

[73] Assignee: International Paper Company, New York, N.Y.

[21] Appl. No.: 147,988

[22] Filed: May 8, 1980

[51] Int. Cl.$^3$ .......................... B32B 35/00; B05D 3/12
[52] U.S. Cl. .......................... 427/140; 118/413; 118/415; 156/94; 427/358
[58] Field of Search .................. 156/94; 427/140, 356, 427/358; 118/413, 415

[56] References Cited

U.S. PATENT DOCUMENTS

| | | | |
|---|---|---|---|
| 2,860,597 | 11/1958 | Works et al. | 118/413 |
| 3,011,903 | 12/1961 | Clock et al. | 156/94 X |
| 3,457,094 | 7/1969 | Elmendorf et al. | 427/140 |
| 3,478,791 | 11/1969 | Elmendorf | 427/140 X |
| 3,741,853 | 6/1973 | Forsythe et al. | 156/94 X |
| 3,853,902 | 9/1974 | Elmendorf | 156/94 X |

*Primary Examiner*—Michael R. Lusignan
*Attorney, Agent, or Firm*—Royal E. Bright; Walt Thomas Zielinski

[57] ABSTRACT

High solids mastics comprising a curable liquid resin binder, granular mineral filler and an organo titanate coupling agent, processes and apparatus for their use in continuous filling of defects in cellulosic boards, as well as, articles of manufacture produced therefrom are disclosed. The resin binder in fluid condition may either be a high solids latex emulsion or certain selected curable liquid resin systems.

14 Claims, 3 Drawing Figures

UPGRADING OF CELLULOSIC BOARDS

BACKGROUND OF THE INVENTION

This invention relates to compositions of matter classified in the art of chemistry as high solids polymer compositions including latices useful in filling relatively deep surface defects in cellulosic boards such as plywood veneer layers and the like. The compositions are also useful in filling surface imperfections in other articles such as flake and composition boards as sandable fillers free of metallic lead for smoothing irregular sheet metal work as in fabrication or of automobile and truck bodies and for smoothing irregularities in wood, metal, or plastic boat hulls, and the like.

The use of plywood as a construction material and as panelling is extensive and well known. Typically plywood is prepared by laminating thin sheets of wood which have been peeled circumferentially from a log. Lamination is by adhesives, usually urea-formaldehyde or phenol formaldehyde, normally under heat and pressure. During the peeling operation knots and other imperfections are cut through and carried along with the sheet. The use of sheets with voids from such defects or from knots that have become detached from the sheet to leave holes for face veneers on plywood results in an unattractive surface unsuitable for decorative use. Such sheets although structurally sound are less valuable commercially. Blemishes may also be introduced by gouging or other impacts and like treatment. Such defects as well as splits and cracks also reduce the value of the plywood for decorative purposes. They also make it difficult to apply a smooth laminas topcoat to the wood because the irregularities are reflected through to the topcoat surface. Hand patching of the larger blemishes by cutting out a standard shape encompassing the blemish or the missing knot and replacing it with a shaped wooden plug secured by adhesive has long been the industry practice. The disadvantages of this procedure are obvious. Smaller defects have been filled by mastic like material but hand operation for filling of each individual defect has been the rule here also. Neither operation provides the economies of automatic operation and large scale rapid filling and handling of the boards in the blemish repairing operation and thereafter.

The present invention provides a process which does exactly this.

CITATION OF RELEVANT LITERATURE

U.S. Pat. No. 3,457,094 to Elmendorf et al teaches the use of slurry employing a thermo-setting resin such as a phenolic resin, or a peroxide curable polyester resin in combination with marble dust. Said slurry is overfilled in the defect with the aid of a vibrating doctor blade and heat cured. The overfilling is to allow for shrinkage due to water evaporation. The vibrating doctor blade is stated as necessary to get both complete filling in all the void space and the slight overfill. Application of a hot plate to secure a flat surface is set forth as desirable. If the filled boards are to be stacked wet, the use of an intermediate layer of sawdust is taught as necessary to prevent bonding of one board to another. In actual practice it has been found that a vibrating doctor blade may cause separation of the mastic emulsion. U.S. Pat. No. 3,011,903 to Clock et al provides a process for repairing plywood veneer defects employing an ambient temperature air drying mastic comprising an aqueous polymer latex and a mineral filler. The aqueous polymer dispersions are required to be film forming on standing in air. The process requires that the defects be filled, the filler air dried then warmed to soften and fuse the mastic to insure complete filling of the defect and a good bond to the board. The invention is stated, Col. 2, lines 60 to 65, as not suited for repair of major defects like holes, filling knotholes, remedying deep cuts or acting as a mastic but solely to remedy minor surface blemishes and provide uniform paintability. Drying at high temperatures (above 70° to 80° C.) to form an initial coherent film is taught as retarding later cure of the mastic.

Other background patents of which applicant is aware but which are not believed relevant or material to patentability of this invention are U.S. Pat. Nos. 2,337,792; 3,155,558; 3,478,791; 3,741,853; 3,835,902; 3,844,863; and German Pat. No. 432,036.

SUMMARY OF THE INVENTION

The invention provides a mastic for upgrading cellulosic boards said mastic comprising:

(a) a curable liquid resin binder (b) a granular mineral filler having a Moh's hardness of 5.0 or less and having substantially all particles sized less than 0.30 mm; and (c) an organo titanate coupling agent.

The tangible embodiments of this composition aspect of the invention possess the inherent physical properties of being stable emulsions, having pot lives of 72 hours or more, and the inherent applied use properties of being readily flowable into irregular defects in plywood veneers or other cellulosic board surfaces to completely fill said defect and of being sufficiently viscous to allow slight overfilling to allow for shrinkage on curing. The complete filling and overfilling may be effectively accomplished with a stationary doctor blade under no or slight applied pressure. The cured mastic possesses enhanced adhesion as a filler in defects in cellulosic boards wherein a substantial surface of the defect comprises a coating of cured phenol formaldehyde or urea-formaldehyde glue.

Special mention is made of tangible embodiments of this composition aspect of the invention wherein the curable liquid resin binder is an aqueous polymer latex having coherent film forming characteristics on drying at temperatures in excess of 170° C. and capable of undergoing complete cure at ambient temperature while having a filmed over surface.

The invention also provides a process for upgrading cellulosic boards having deep surface defects which comprises:

(a) filling said defects with a mastic comprising a curable liquid resin binder, a granular inorganic filler, and an organo titanate coupling agent;

(b) heating said board, filled with said mastic, produced in step a above at a temperature sufficient to form at least a cured coherent film on the surface of said mastic; and (c) allowing the filmed over mastic produced in step b above to continue cure at ambient temperature.

The invention also provides an article of manufacture comprising a cellulosic board having at least one deep surface defect filled with a cured mastic, said mastic before cure comprising a curable liquid resin binder, a granular inorganic filler, and an organo titanate coupling agent.

The invention also provides apparatus for continuous repair of deep surface defects in cellulosic boards comprising:

(a) means for filling said defects in said board with a mastic which comprises a curable liquid resin binder, a granular inorganic filler and an organo titanate coupling agent, said means comprising a doctor blade having pressure applying means attached thereto, retaining end dams and a back plate;

(b) means for heating said boards, filled with said mastic, produced by means a above at a temperature sufficient to form at least a cured coherent film on the surface of said mastic;

(c) means for cooling said heated boards of means b to ambient temperature; and (d) means for stacking and storing said cooled boards of means c to allow complete cure of said mastic.

DESCRIPTION OF THE PREFERRED EMBODIMENT

Figure 1:
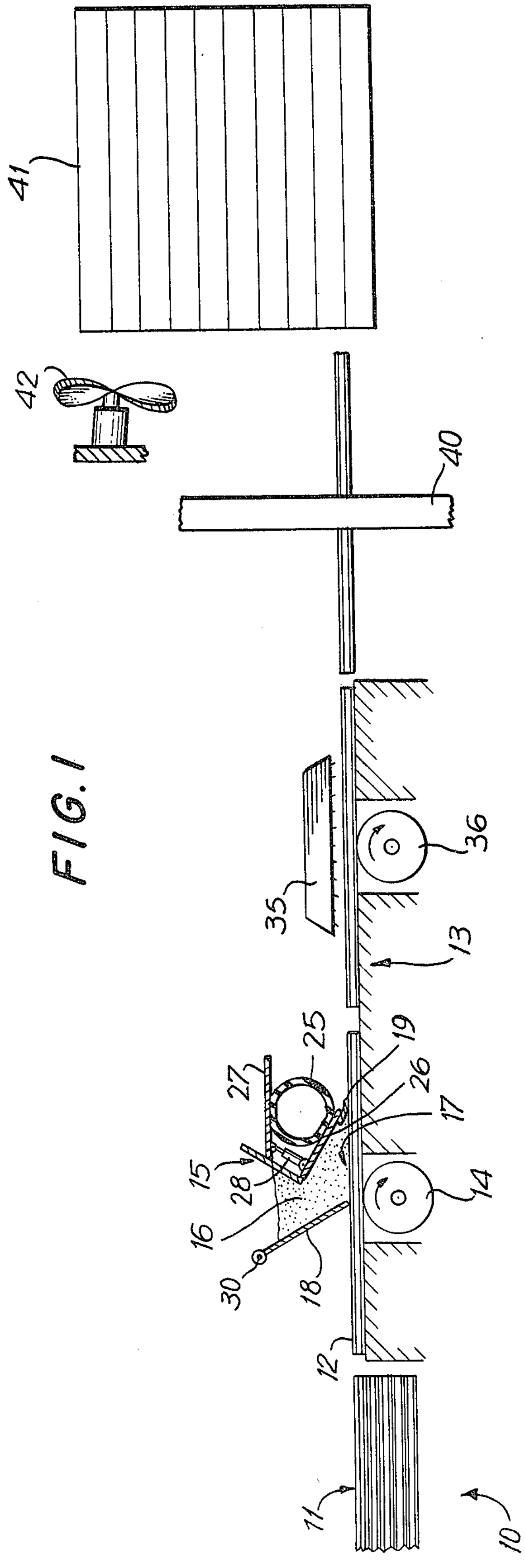
FIG. 1 is a side elevation view, partly in schematic form, of a plywood upgrading line illustrating features of the present invention.

Referring now to FIG. 1 an inlet station 10 is shown in which a plurality of plywood sheets 11 are stacked awaiting introduction into the upgrading line. A first plywood sheet 12 is shown advancing into the upgrading line from the inlet station. The plywood sheets can be manually introduced into the line or they can be introduced seriatim, and automatically, by an appropriate inlet feed mechanism, not shown.

A machine frame 13 is shown in which a drive roller 14 is rotatably mounted for advancing the plywood sheets. The drive roller 14 is appropriately driven by a conventional motor and drive means, not shown. Pivotally mounted to the machine frame, at pivot 30, is a filler head 15 containing the mastic 16. The lower portion of filler head 15 includes opening 17 which is defined by rear wall 18 of the filler head, its front wall 26 and a doctor blade 19 appropriately mounted to depend from the front wall of the filler head. The doctor blade is positioned to form an acute angle in the range of about greater than 0° to about 60° plywood sheet. It is important that the doctor blade be essentially rigidly mounted so as to provide freedom from any vibration thereof with respect to the plywood sheet. Nevertheless, the thickness of the doctor blade 19 is selected to provide a slight curvature thereof at its exit tip when the doctor blade is urged by the application force described below.

The application force is provided by a combination of a pneumatic air tube or bag 25 mounted above the front wall 26 of the forming head 15, and pairs of pneumatic cylinders 28 also mounted above front wall 26 at either end thereof. This air bag 25 is mounted lengthwise along the upper surface of the wall 26 and below a restraining wall 27 provided along the front surface of the forming head 15 which is fixed to the machine frame. The pneumatic cylinders 28 are also flexibly mounted between the wall 26 and the restraining wall 27.

As pneumatic pressure is provided in the air bag 25 and the pneumatic cylinders 28, a force is thereby applied to the wall 26 for urging the doctor blade into contact with the plywood sheet. The resulting force is the normal application force of the doctor blade against the plywood sheet. As the sheet progresses passed the doctor blade, the mastic, by force of gravity, is deposited upon the entire surface of the plywood sheet and any excess mastic is prevented from forming on the plywood surface and a smooth uniform surface finish is obtained by action of the doctor blade 19.

When the mastic of the present invention is employed, a doctor blade angle, illustrated as the acute angle between the blade and plywood sheet, in the range of about 0° to about 60° will provide satisfactory results. Best results can be obtained using a doctor blade angle in the range of about 10° to about 20° Also, with the mastic of the present invention satisfactory results will be obtained if an application force is established in the range of about 3 to about 22 pounds per linear inch of width of the plywood sheet. Best results are obtained using an application force in the range of about 5 to 22 pounds per linear inch.

It can be understood that the application force is a force normal to the plywood surface and is the resultant of two contributing forces. The first is the weight of the filler head and its contents acting in depending relationship from the pivotal connection 30 of the filler head with the machine frame. The second contributing force is the downward force applied by the pneumatic air bag 25 on the wall 26.

After the deposition of the mastic, the plywood sheet is advanced to a heat curing station 35 with the assistance of drive roller 36, rotatably mounted in the machine frame, which is, in turn, preferably driven by drive means common to both the roller 36 and 14. The heat curing station 35 comprises a plurality of conventional infra red heaters for radiation heating of the filled plywood surface. The plywood sheets are continuously advanced at a speed of from about 16 to about 50 feet per minute preferably about 30 feet per minute through the upgrading line including through the heat curing station 35. Thereafter, the plywood sheets are continuously received by an automatic panel stacking station 40 which is comprised of conventional machine elements for automatically receiving the plywood sheets, moving them upwardly, and depositing each sheet in the next available position in a fixed air cooling tower 41. The cooling tower 41 preferably includes at least 12 horizontal shelf like receiving positions, each separated from the next by a vertical distance of approximately 6 to 12 inches. A high volume fan 42 is provided for providing an air stream over the plywood sheets in the tower 41. The tower performs the dual functions of cooling the plywood sheets while the curing of the slurry, which had been commenced in the curing station 35, is allowed to continue.

The tower 41 can be continuously unloaded manually or by appropriate well known automated mechanical means, not shown.

Figure 2:
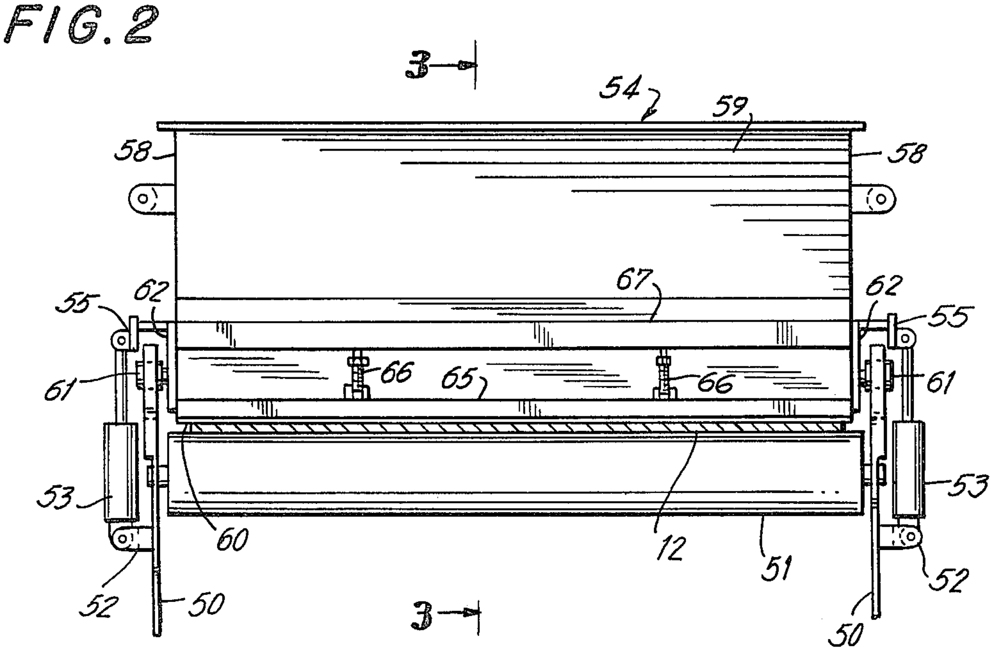
FIG. 2 is a front elevation view, partly in schematic form of an alternative preferred filler head embodiment for a plywood upgrading line.
Figure 3:
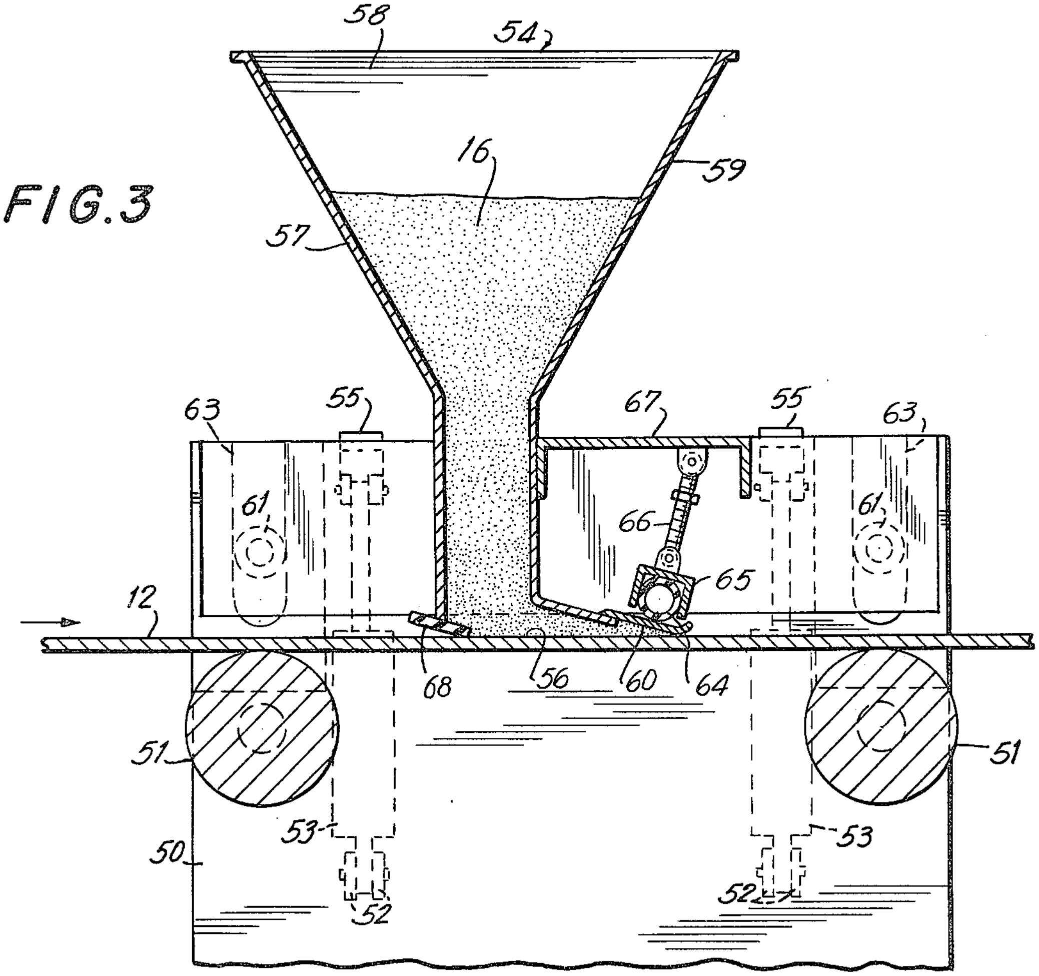
FIG. 3 is a cross sectional view along Section 3—3 of the filler head of FIG. 2.

Referring now to FIGS. 2 and 3 a machine frame 50 is shown in which drive rollers 51, rotating clockwise as shown, is rotatably mounted for advancing plywood sheet 12. The drive rollers 51 are appropriately driven by a conventional motor and drive means not shown. Mounted to the machine frame by fastening by conventional means to lugs 52, are air cylinders 53 to which the filler head 54 is fastened by lug means 55. The lower portion of filler head 54 containing mastic 16 including opening 56 which is defined by rear wall 57 of the filler head, its side walls 58 and its front wall 59 and a doctor blade 60 appropriately mounted to depend from the front wall. The doctor blade is positioned at angles similar to those described for doctor blade 19. The necessity for vibration free mounting and the curvature near the tip are also analogous to doctor blade 19.

To provide for vertical movement of the filler head, but restriction of lateral forward and backward movement during filling operations, when the air cylinders are pressurized or depressurized to cause them to lower or rise respectively, pins 61 are provided on extensions 62 of side walls 58. Lugs 55 are conveniently mounted on extension 62 also. Pins 61 are free to move vertically in channels 63 provided in machine frame 50. To provide a more positive seal to opening 56 between rear wall 57 and plywood 12 so that mastic 16 is confined and cannot leak in the rearward direction, a flexible gasket means 68 is provided suitably fastened to rear wall 57.

The application force is provided by the weight of the filler head and mastic supplemented by the downward pressure which may be provided by introduction of air pressure by conventional means, not shown, to air cylinders 58. To insure that this application force is applied at the exit tip of doctor blade 60, a pneumatic air tube or bag 64, pressurizable through conventional means, not shown, is provided. This allows even distribution of pressure over the length of the doctor blade as well as some flexibility for irregularities in the plywood. The air tube is held in place by channel means 65 which is vertically adjustable and flexibly mounted through telescoping screw means to restraining wall 67 which is in turn rigidly mounted to front wall 59.

The mode of operation is analogously the same as described herein above for filler head 15.

The manner of making and using the compositions of the invention will now be described with reference to a specific embodiment thereof namely a mastic comprising an acrylic emulsion a titanate coupling agent, a polymeric dispersing agent, marble dust, defoamer and a viscosity control agent. To prepare this mastic, to an acrylic latex emulsion, conveniently Rhoplex AC61 sold by Rohn and Haas Co. may be added a titanate coupling agent, conveniently KR-238S sold by Kenrich Petroleum Chemicals, after a short mix sufficient to disperse the two materials in one another, a polymeric dispersing agent, conveniently I-98 dispersion resin sold by Rohm and Haas Co., may be added and blended in with another short mix. At this stage marble dust, conveniently a marble dust with 97 to 98% particles passing a 200 mesh U.S. Standard Screen such as Whiting XX marble dust sold by Manufacturers Mineral Co., Renton, Washington may be added and blended into the mixture at high speed for a short period of time, conveniently about three minutes. A second larger quantity of marble dust having larger particle size, conveniently about 60 mesh U.S. Standard Screen such as D-100 marble dust sold by Manufacturers Mineral may be added followed by additional high speed blending for a slightly longer period of time, conveniently about five minutes. To this mixture may then be added a defoamer, conveniently Nopco NXZ sold by Diamond Shamrock which may be blended by mixing in at moderate speed for about ten minutes. If it is desired to raise the viscosity of the mastic so produced a thickening agent, conveniently acrysol ASE-60 sold by Rohm and Hass may be added slowly to the vortex while stirring the mixture.

One skilled in the art would recognize that in addition to the specific acrylic latex mentioned hereinabove other acrylic latices known in the art such as Rhoplex B60A, Rhoplex AC34, and Rhoplex C72 all sold by Rohm and Haas as well as UCAR Latex 189 sold by Union Carbide Corp. would also be suitable. Also, it will be obvious that latices of other polymers and copolymers will be suitable for use in formulating analogous systems. Illustrative of these latices are those of styrene and butadiene containing from about 60 to 70 percent styrene, polyvinyl acetate modified alkyd resins and copolymers of vinyl acetate with another copolymerizable monomer such as vinyl chloride and acrylonitrile polymers and copolymers of the alkyl acrylates and rubber hydrochloride. Further examples are ternaries of the abovementioned monomers as well as those of vinylidene chloride and vinyl chloride which have been internally plasticized by polymerization therein of an alkyl acrylate. All of the abovementioned examples are commercially available in latex form. Also suitable are polysulfide polymer water dispersions as described in Fettes and Jorcyzak, Industrial and Engineering Chemistry, Vol. 42, page 2217 (1950), particularly when chemically softened as described therein for continuous sheet formation. These latter polymers may provide enhanced solvent and water resistance to cured mastics.

Other examples of operable polymeric materials will be within the skill of the worker in the polymeric latex art. Latices of polymers which are not commercially available may be readily prepared by well known methods of emulsion polymerization. The latices should be film forming through simple deposition and air drying at temperatures greater than 170° C. and then completely curable by evaporation of the remaining moisture at ambient temperature if coherent surface treatments without blocking or sticking of stacked panels during a continuous operation are to be achieved.

Fillers useful in formulating the mastics of this invention in addition to the marble dust illustrated herein above may be any mineral having a hulk density equal or greater than the wood being repaired and which have a particle size passing a 40 mesh U.S. Standard Screen (0.30 mm opening) or smaller. It is preferred that the filler consist of a majority of particles passing a 60 mesh screen and a minority of particles passing a 200 mesh screen. The relative proportions are not especially critical and may be varied at the option of the operator.

Comminution to smaller sizes if appropriate sizes are not commercially available may be accomplished by standard wellknown techniques. It is also preferred that the mineral filler particles be in the lower range of the Moh's hardness scale particularly if substantial sawing or other tooling operations are contemplated on the repaired board as the harder fillers such as sand or silica may act as abrasives and cause excessive wear to the cutting edges of saws or other tools.

Minerals having a Moh's hardness of less than 5.0 will be preferred. In addition to the marble already mentioned, other illustrative, but not limiting, examples of such inorganic fillers are alabaster, anglesite ($PbSO_4$), anhydrite ($CaSO_4$), anthracite, apatite ($CaF_2$, $3Ca_3P_2O_8$), aragonite, barite, barysilite ($Pb_3Si_2O_7$), biotite [(K, $H)_2(Mg, Fe)_2(Al, Fe)(SiO_4)_3$], bornite (FeS, $ZCu_2S$, CuS), calcite and other calcium carbonate minerals, carbon black, and graphite, celestite ($SrSO_2$), chalcopyrite ($CuFeS_2$), chiolite ($5NaF.3AlF_3$), clinochlorite ($H_8Mg_5Al_2Si_3O_{18}$), crocoite ($PbCrO_4$), cryolite ($Na_3AlF_6$ or $3NaF.AlF_3$), cryolithionite ($3NaF.3LiF.2AlF_3$), cuprite ($Cu_2O$), diatomaceous earth, dolomite, eulytite ($3SiO_2.2Bi_2O_3$), ferberite ($FeWO_4$), fluorite, forsterite ($Mg_2SiO_4$), galena (PbS), glauberite ($Na_2SO_4.CaSO_4$), gypsum, halite (NaCl), Kaolinite, lanarkite [$Pb_2S.(SO_4)$], laurionite [$PbCl_2.Pb(OH)_2$], leadhillite [$Pb(OH)_2.PbSO_4.2PbCO_3$], lepidolite [$KLi(Al(OH,F)_2)Al(SiO_3)_3$], Litharge (PbO), matlockite ($PbO.PbCl_2$), mendipite ($2PbO.PbCl_2$), meerschaum, mica, mimetite ($9PbO.PbCl_2$), monetite ($HCaPO_4$), nantokite (CuCl), parisite ($CaO.2CeOF.3CO_2$), phlogopite [$(K,H)_3Mg_3Al(SiO_4)_3$ . . . (+Na, Fe, F)], powellite ($CaO$, $MoO_3$), pyromorphite [$PbCl_2.3Pb_3(PO_4)_2$], pyrrhotite ($Fe_5S_62Fe_{16}S_{17}$), scheelite ($CaWO_4$), serpentine, silver chloride, stolzite (PbO, $WO_3$), strontianite ($SrCO_3$), Stibnite, sylvite (KCl), sulfur, talc, thenardite ($Na_2SO_4$), triphylitelithiophylite [Li(Fe, Ma)$PO_4$], vanadinite ($9PbO.3V_2O_5.PbCl_2$), villiaumite (NaF), witherite ($BaO.CO_2$), wollastonite ($CaSiO_3$), wulfenite ($PbMoO_4$), xenotime ($Y_2O_3.P_2O_5$).

It is also possible to employ mixtures or blends of latices or fillers at the option of the operator. Each of the components of such a mixture or blend must satisfy all the requirements of a single material.

One skilled in the art will also recognize that where a particular proposed filler material has significant water solubility or substantial acidity or basicity a rapid preliminary check on a small scale should be run to assure that such filler will not induce coagulation of a particular latex emulsion with which it is proposed to employ the filler.

It has been found that to secure maximum adhesion of the compositions of the inventionn to the cellulosic boards when a defect therein include on a surface thereof cured binder adhesive, particularly phenol formaldehyde or ureaformaldehyde derived adhesives, an organo titanate coupling agent must be included. KR-238S sold by Kenrich Petroleum Chemicals is a typical titanate coupling agent which has been found suitable, but one skilled in the art will recognize that other organo titanates, well known in the literature, such as, KR138S and KR112S will be equally suitable. Although these particular titanates have a chelate structure and are preferred for aqueous emulsions, other non-chelated organo titanates may be employed and in 100% solids non-aqueous systems these latter will be preferred. One skilled in the art will also recognize that the compatibility of any solvent employed for any particular organo titanate solution should desirably be checked by a quick small scale test to establish compatibility with the polymer emulsion to be employed. In addition to the optional dispersing and thickening agents described hereinabove other conventional materials such as polymeric surfactants such as Tamol 731 (Rohm and Haas) and Daxad 30 (W. R. Grace) and hydroxyethal cellulose and caraboxyl methyl cellulose and the like may be employed as dispersants and thickeners respectively.

In addition to the polymer emulsions illustrated herein above, it will be obvious to one of skill in the art that various 100% solids curable liquid resin formulations having a cured hardness of from about 30 Shore A to about 90 Shore A may also be employed as the liquid binder resin.

Other additives such as cross linking agents, e.g. Glyoxal, and filming aids, e.g. butyl carbitol acetate, butyl cellosolve acetate, Texanol (Eastman) and butyl or ethyl acetate may optionally be employed also.

Binder systems developed for applications having high inorganic solids loadings such as in solid propellants are of particular utility. Systems developed recently having delayed cure onset such as those of U.S. Pat. Nos. 4,110,135 and 4,098,626 which permit long pot lives and mild initiation of cure to allow void free casting with little shrinkage are of special interest.

The relative proportions of the various ingredients in the formulations may vary within wide limits. To minimize shrinkage on curing the solids content should be as high as practicable consistent with good wetting and binding of the inorganic filler. When employing a latex as the liquid resin component its solids content should desirably be as high as possible. Rhoplex AC61 illustrated herein has an average solids content of 46 to 47%. The mineral filler may be employed at levels two or more times by weight of the total solids content. The marble dust illustrated herein may be employed at five times by weight of the solids content of the Rhoplex AC61. One skilled in the art would have no trouble in determining what the maximum filler loading in any particular liquid resin should be with a minimum number of graded small scale trails.

The titanate coupling agent need only be incorporated in small quantities to exert its maximum effect. Quantities of from 0.1% to 0.5% by weight of the total weight of the filler composition are preferred. Larger quantities may be employed, but any effect of the larger quantity will not compensate for the greater cost.

The dispersion resin need only be employed in moderately small amounts also. Quantities up to about 5% by weight of the total composition may be employed with quantities of about 0.03% by weight of the total composition giving satisfactory performance.

The thickening agent which may be employed at the option of the operation may also be incorporated at relatively low levels. The exact level preferred for any particular formulation may readily be determined by a simple series of graded tests conveniently the same small scale test wherein compatibility and quantity of filler for the liquid resin are determined. The quantity of thickener required for optimum flow properties may be determined by incorporating graded quantities in those tests. In the formulations illustrated herein quantities of from about 0.2% to about 3% by weight of the final formulation weight, with about 0.45% being preferred, have been found satisfactory. Desirably a final Brookfield viscosity of from about 5,000 cps to 20,000 cps will be employed.

One skilled in the art will also recognize that for a uniform cured patch occluded gas, such as, air in the mastic is undesirable. The incorporation of a defoaming agent at least in those mastic formulations of higher viscosity, thus, may be desirable. The particular defoamer selected is not particularly critical and the minimal amount necessary to suppress foam in a particular formulation is readily determined and is preferred for economic reasons. Nopco NXZ defoamer supplied by Diamond Shamrock has been found satisfactory in quantities up to 0.5% by weight of the final formulation weight, with about 0.03% being preferred, for use in the mastic specifically illustrated herein.

As stated hereinabove, an apparatus which has been found satisfactory for practicing the continuous filling process may consist of conventional equipment. The cellulosic board having defects in an exterior layer is transported in a horizontal position with its layer to be filled on the upper surface under a doctor blade and associated side dams and retaining plate as illustrated. Neither the doctor blade or board is vibrated, however, as this has sometimes been found to cause separation and stratification of mastics. The doctor blade pressure is adjusted by pressure applying means, pneumatic bags or cylinder or screw means are typical, but not limiting, presssure applying means, so that just sufficient mastic flows to slightly overfill the hole. By allowing for any shrinkage on cure, this assures that after cure and any required sanding a flat uniform surface is attained. Pressures of from 0 to 20 pounds per square inch on the doctor blade employing fillers with viscosity of from 5,000 to 20,000 centipoises (Brookfield, #7 spindle) have been found satisfactory. After filling, the panel may then be passed directly to and through a conventional curing oven wherein sufficient heat, about 170° to 180° C. for aqueous latex based mastics on the board surface is applied for sufficient time, conveniently about seven minutes for the formulations illustrated specifically herein, to form at least a firm non-tacky film on the patch surface. The boards leaving the oven are transferred to and through a conventional cooling tower wherein they are subject to a flow of ambient temperature air to aid in further hardening of the film on the mastic surface. When approximately ambient temperature is reached, the boards may then be stacked and stored in conventional fashion, no intermediate layering materials being necessary, to allow final cure to occur. Two or three days is a convenient time for the mastic formulation illustrated specifically herein.

One skilled in the art will obviously be able to devise variations on the apparatus either to take advantage of equivalent equipment in a particular processing operation, or because of cure requirements for a particular liquid resin binder formulation chosen for the mastic. For example, curable 100% solids resins may be chemically cured, for example, urethanes having blocked cross linking agents or delayed cure catalysts, or they may be cured by heat, for example, polyesters, or actinic radiation, for example, acrylics with ultraviolet cure accelerators, or electron beam, for example, hydroxyalkylacrylate terminated urethanes. The heating oven may be modified or replaced with ultraviolet lights or an electron beam curtain as appropriate. The heating oven may be of any commercial type. An infra red oven is a convenient type of oven for the cure of the mastic specifically illustrated herein. Suitable temperatures in a particular oven to initiate cure and provide coherent film surface of a particular mastic will be obvious to one of skill in the art who will have selected ingredients with known cure requirements.

The following examples further illustrate the best mode contemplated by the inventor for the practice of his invention.

EXAMPLE 1

A mastic is formulated by adding to Rhoplex AC61 [25 parts by weight (pbw)] in a blender, KR 238S (0.18 pbw) in triethanol amine (2:1 solute: solvent), blending until smooth, and I-98 (0.03 pbw), and again blending until smooth. Whiting XX marble dust (9.3 pbw) is then added and the mixture is attained. Whiting D100 marble dust (65.4 pbw) is then added and the mixture blended a further five minutes at high speed until smooth. The Nopco NXZ (0.03 pbw) is then added and the entire mixture blended for about ten minutes at a lower speed than used for blending the marble dust. During this mixing period ASE-60 (0.45 pbw) is added to the vortex in the blender.

The above mastic has a cure time (pot life) of 2 to 3 days at ambient temperature a solids content of 87% a pH of 10 and a minimum ambient curing temperature of about 18° C.

When stored in an airtight container pot life is 72 hours at 68° F. When treated at a surface temperature of about 170° C. seven minutes is required for formation of a film sufficently strong and tack free to avoid blocking (sticking together) of panels when stacked without interleaving material. After ten hours standing at 18° C. the patches are sandable. Full bond strength is exhibited after two days at temperatures above 18° C.

The cured patches may be sanded smooth in conventional fashion, blend well in color with western plywood, may be sawed through readily and may be painted over smoothly.

The mastic may be blended in any convenient paint mill type blender. It has been found convenient to transfer the blended mastic to a propeller type mixer for the optional addition of the defoamer. In the above example a double planetary type paint mill is convenient. Low speed blending is at ten revolutions per minute (rpm) and high speed blending is at 80 rpm. The propeller type mixer for the addition of Nopco NXZ is operated at ten rpm.

EXAMPLE 2

A mastic having the following formulation is blended in a fashion analogous to that described in Example 1:

| | |
|---|---|
| UCAR Latex 189 (Union Carbide acrylic emulsion) | 25 pbw |
| Acrysol I-98 | 0.03 pbw |
| KR 238S | 0.18 pbw |
| D-100 marble dust | 72 pbw |
| Butyl cellosolve | 0.03 pbw |
| Cellosize (Union Carbide, hydroxyethyl cellosolve) | 0.8 pbw |
| glyoxal | 1 pbw |

Fill and cure of boards is as described hereinabove to obtain analogous results to those described in Example 1.

The subject matter which applicant regards as his invention is particularly pointed out and distinctly claimed as follows:

1. A continuous process for upgrading cellulosic boards having deep surface defects which comprises:

(a) filling said defects in said boards by continuously feeding said boards under means for applying a mastic to said defects in said board, said means comprising a filler head having front and back faces, end dams, and a nonvibrating doctor blade to which a downward component of force can be applied, to produce mastic filled boards;

(b) heating the mastic filled boards produced in step (a) above at a temperature sufficient to form at least a coherent film on the surface of said mastic; and (c) allowing the filmed over mastic produced in step (b) above to continue cure at ambient temperature.

2. A process as defined in claim 1 wherein the mastic comprises a curable liquid resin binder; a granular mineral filler having a Moh's hardness of 5.0 or less and having substantially all particles sized less than 0.30 mm; and an organo titanate coupling agent.

3. A process as defined in claim 2 wherein the curable liquid resin binder is an aqueous polymer latex having coherent film forming characteristics on drying at temperatures in excess of 170° C. and capable of undergoing complete cure at ambient temperature while having a filmed over surface.

4. A process as defined in claims 2 or 3 wherein the curable liquid resin binder is an acrylic latex.

5. A process as defined in claims 2 or 3 wherein the mastic additionally contains a suspending agent.

6. A process as defined in claim 4 wherein the mastic additionally contains a suspending agent.

7. A process as defined in claims 2 or 3 wherein the mastic additionally contains a thickening agent.

8. A process as defined in claim 4 wherein the mastic additionally comprises a thickening agent.

9. A process as defined in claim 1 wherein the mastic comprises:

(a) an acrylic latex binder;
(b) a chelated organo titanate coupling agent;
(c) marble dust inorganic filler;
(d) a polymeric surface active dispersing agent;
(e) an acid containing cross linked acrylic emulsion copolymer thickening agent; and
(f) a defoaming agent.

10. A process as defined in claim 1 wherein the mastic comprises:

(a) from 2.4 to 2.5 parts by weight acrylic emulsion;
(b) from 0.1 to 0.5 parts by weight organo titanate coupling agent;
(c) from 0 to 10 parts by weight marble dust;
(d) from 0 to 5 parts by weight dispersion resin;
(e) from 65 to 74 parts by weight marble dust;
(f) from 0 to 0.5 parts by weight defoamer; and
(g) from 0.2 to 3 parts by weight thickener.

11. A process as defined in claim 10 wherein the mastic comprises:

(a) 25 parts by weight acrylic emulsion;
(b) 0.18 parts by weight organo titanate coupling agent;
(c) 0.03 parts by weight dispersion resin;
(d) 9.3 parts by weight Whiting XX marble dust;
(e) 65.4 parts by weight D-100 marble dust;
(f) 0.45 part by weight thickener; and
(g) 0.03 parts by weight defoamer.

12. A process for upgrading cellulosic boards employing a mastic comprising a curable liquid resin binder and a granular inorganic mineral filler applied continuously to said cellulosic boards requiring said upgrading from filler means having front and back plates and end dams and doctor blade means for controlling deposition of said filler, the improvements comprising said mastic containing an organo titanate coupling agent and said doctor blade being non-vibrating and having means for applying downward pressure thereon.

13. Apparatus for continuous repair of deep surface defects in cellulosic boards comprising:

(a) means for filling said defects in said board with a mastic which comprises a curable liquid resin binder, a granular inorganic filler and an organo titanate coupling agent, said means comprising a non-vibrating doctor blade having pressure applying means attached thereto, retaining end dams and a back plate;
(b) means for heating said boards filled with said mastic of means (a) at temperatures sufficient to form at least a coherent film on the surface of said mastic;
(c) means for cooling said heated boards of means (b) to ambient temperature; and
(d) means for stacking and storing said cooled boards of means (c) to permit complete cure of said mastic.

14. Apparatus for filling open defects in the surface of a plywood sheet with a mastic comprising:

(a) a machine frame;
(b) means for advancing said plywood sheet along said machine frame in a horizontal direction with a surface of said plywood sheet having open defects disposed upwardly;
(c) a forming head for containing said mastic and for deposition said mastic upon said surface of said plywood sheet;
(d) said forming head including an inlet opening in the upper portion thereof for receiving said mastic, an exit opening in the lower portion thereof for depositing said mastic upon said plywood surface and a non-vibrating doctor blade defining said exit opening and for coating said mastic upon said plywood surface;
(e) mounting means for mounting said forming head to said machine frame above said plywood surface; and
(f) force applying means, operatively connected with said forming head for urging said doctor blade into contact with said plywood surface with a force sufficiently great to fill said defects with said mastic and sufficiently small to permit a major portion of said plywood surface to be coated with said mastic.

* * * * *